United States Patent
Nam

(10) Patent No.: US 10,015,838 B2
(45) Date of Patent: Jul. 3, 2018

(54) METHOD AND APPARATUS FOR CONTROLLING DATA COMMUNICATION

(71) Applicant: Samsung Electronics Co., Ltd., Gyeonggi-do (KR)

(72) Inventor: Seunghoon Nam, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 160 days.

(21) Appl. No.: 14/902,971

(22) PCT Filed: Jul. 24, 2014

(86) PCT No.: PCT/KR2014/006744
§ 371 (c)(1),
(2) Date: Jan. 5, 2016

(87) PCT Pub. No.: WO2015/020331
PCT Pub. Date: Feb. 12, 2015

(65) Prior Publication Data
US 2016/0143087 A1    May 19, 2016

(30) Foreign Application Priority Data
Aug. 5, 2013  (KR) .................. 10-2013-0092499

(51) Int. Cl.
*H04W 76/28* (2018.01)
*H04W 76/16* (2018.01)
*H04L 12/26* (2006.01)

(52) U.S. Cl.
CPC ............. *H04W 76/28* (2018.02); *H04L 43/16* (2013.01); *H04W 76/16* (2018.02)

(58) Field of Classification Search
CPC ... H04W 76/048; H04W 88/06; H04W 52/02; H04M 19/08
(Continued)

(56) References Cited

U.S. PATENT DOCUMENTS

2006/0238608 A1    10/2006    Lee et al.
2008/0113692 A1*    5/2008    Zhao .................. H04B 15/02
                                                    455/574
(Continued)

FOREIGN PATENT DOCUMENTS

KR    1020060111036    10/2006
KR    1020070013707    1/2007
(Continued)

OTHER PUBLICATIONS

PCT/ISA/237 Written Opinion issued on PCT/KR2014/006744 (pp. 5).
PCT/ISA/210 Search Report issued on PCT/KR2014/006744 (pp. 3).

*Primary Examiner* — Sam Bhattacharya
(74) *Attorney, Agent, or Firm* — The Farrell Law Firm, P.C.

(57) ABSTRACT

A method for controlling data communication in a terminal is provided. The method includes sensing whether a voice call occurs in the terminal, determining whether a data suspension condition is satisfied during the voice call, and suspending the data communication in the terminal during the voice call if the data suspension condition is satisfied. An apparatus for controlling data communication in a terminal is provided. The apparatus includes a communication unit configured to communicate data between the terminal and a base station, and a controller configured to detect whether a voice call occurs in the terminal, determine whether a data suspension condition is satisfied after the voice call occurs, and cause the communication unit to suspend the data communication in the terminal while the data suspension condition is satisfied.

12 Claims, 3 Drawing Sheets

(58) Field of Classification Search
USPC .......... 455/422.1, 552.1, 572, 574; 370/328, 370/331
See application file for complete search history.

(56) References Cited

U.S. PATENT DOCUMENTS

| | | | | |
|---|---|---|---|---|
| 2008/0268816 A1* | 10/2008 | Wormald | .............. | H04W 68/00 455/412.2 |
| 2012/0009930 A1* | 1/2012 | Brisebois | .......... | H04W 52/0264 455/450 |
| 2013/0331069 A1* | 12/2013 | Tsai | .................... | H04W 52/346 455/414.1 |
| 2014/0079022 A1* | 3/2014 | Wang | .................... | H04W 36/22 370/331 |
| 2014/0143629 A1* | 5/2014 | Hassan | ................. | H04W 24/04 714/758 |

FOREIGN PATENT DOCUMENTS

| KR | 1020080056551 | 6/2008 |
|---|---|---|
| KR | 1020080100597 | 11/2008 |
| KR | 1020090102424 | 9/2009 |
| KR | 1020120025798 | 3/2012 |

* cited by examiner

[Fig. 1]
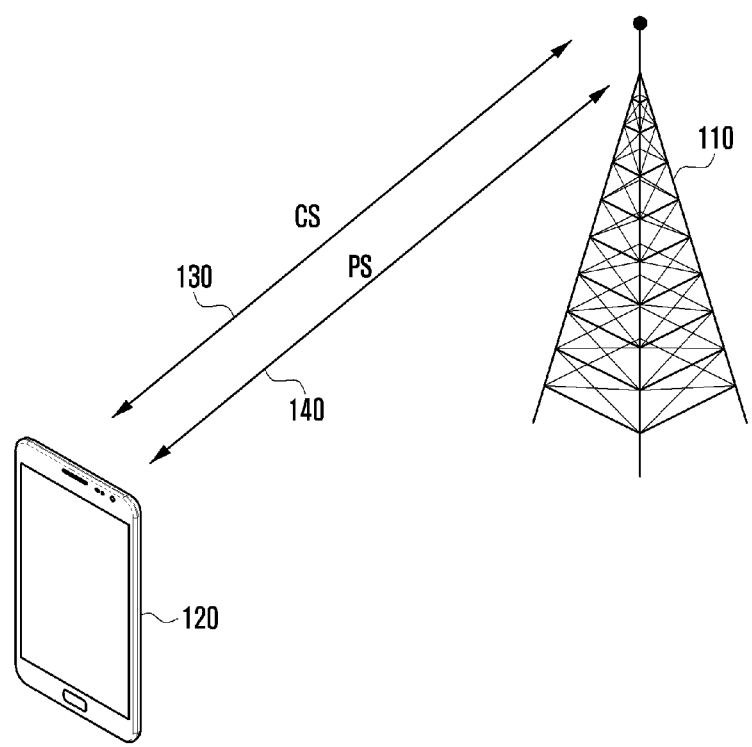

[Fig. 2]
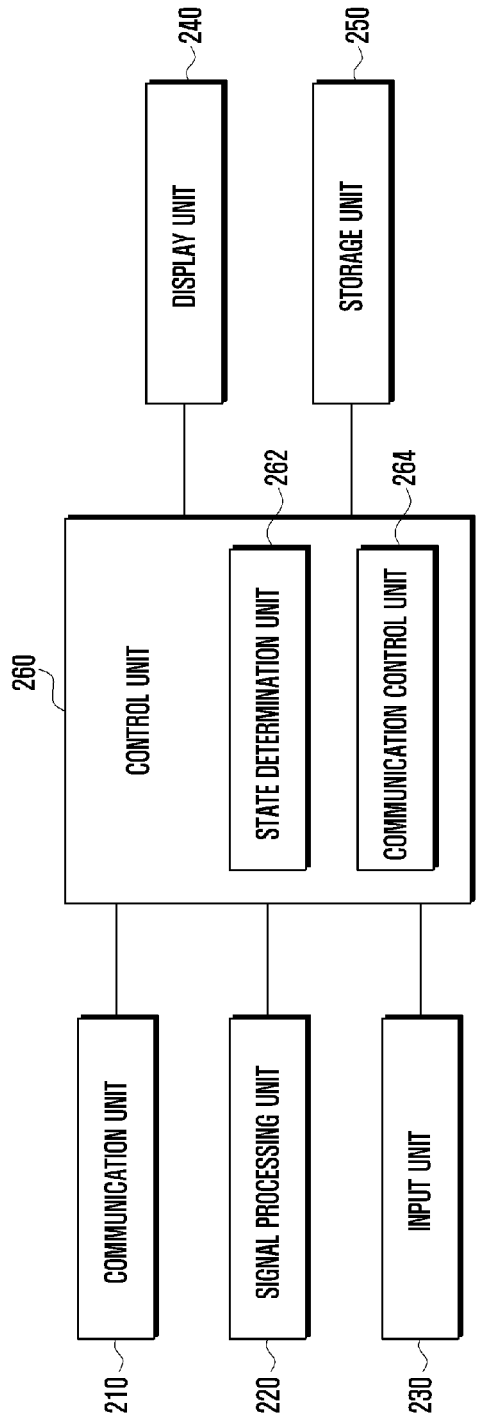

[Fig. 3]
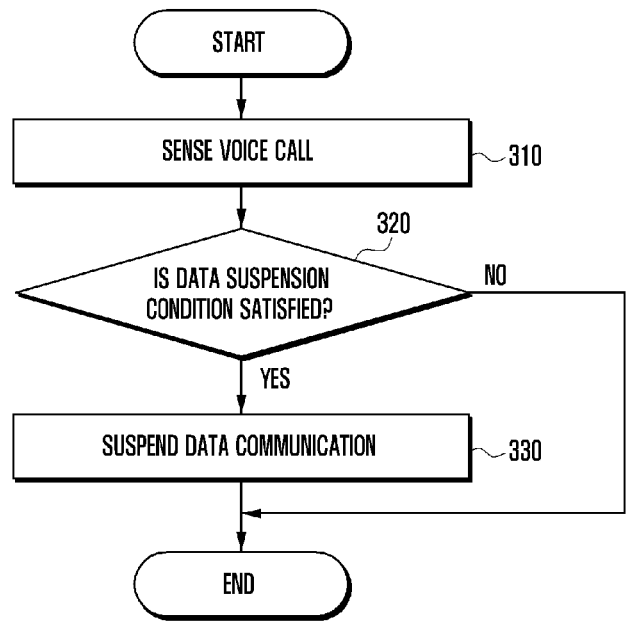
[Fig. 4]
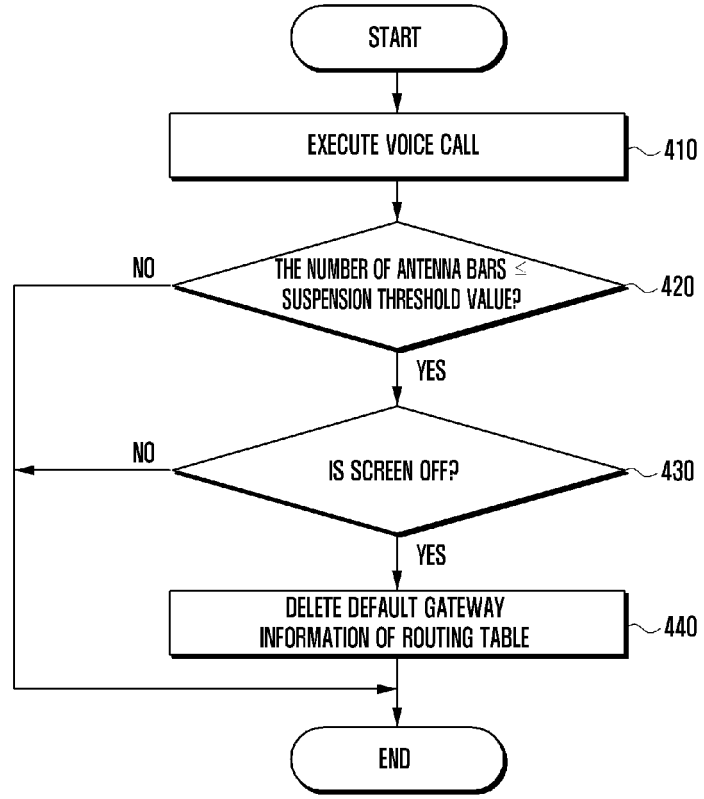

METHOD AND APPARATUS FOR CONTROLLING DATA COMMUNICATION

TECHNICAL FIELD

The present disclosure relates to a method and apparatus for controlling data communication in a weak electromagnetic field, and more particularly to a method capable of controlling data communication in a case where a wireless signal of voice communication that is transferred from a base station to a mobile communication terminal is weak.

BACKGROUND ART

In a 3G mobile communication network, such as Universal Mobile Telecommunications System™ (UMTS™), Wideband Code Division Multiple Access™ (WCDMA™), or High Speed Packet Access™ (HSPA™), a Circuit Switched (CS) domain service, such as voice call and short message service, and a Packet Switched (PS) domain service to transmit a data packet are simultaneously supported. Further, as users of smart phones are increased, it frequently occurs to perform data communication, such as browser and web search, while the voice call is made.

However, in a case where the CS domain service and the PS domain service are simultaneously provided in a 3G mobile communication environment, RF signal interference may occur. In particular, in a weak electromagnetic field situation in which the strength of the wireless signal that is transferred to the terminal is weak, the quality of voice call having high priority may be affected by transmission of unintended background data.

DISCLOSURE OF INVENTION

Technical Problem

To address the above-discussed deficiencies, it is a primary object to improve the quality of a voice call through controlling of data communication that is not intended by a user while the voice call is executed in a weak electromagnetic field situation of a terminal.

Solution to Problem

A method for controlling data communication of a terminal is provided. The method includes sensing whether a voice call occurs in the terminal, determining whether a data suspension condition is satisfied during the voice call, and suspending the data communication in the terminal during the voice call if the data suspension condition is satisfied.

In some embodiments, the data suspension condition is satisfied when a strength of electromagnetic signal that the terminal receives is less than a threshold.

In some embodiments, the determining whether the data suspension condition is satisfied includes converting a signal strength of the terminal into a number of antenna bars that are displayed on a screen of the terminal, and determining whether the number of antenna bars is equal to or less than a threshold.

In some embodiments, the data suspension condition is satisfied when a data communication that is not intended by a user occurs.

In some embodiments, the data communication is not intended when the data communication occurs while the screen is in an off-state.

In some embodiments, the data suspension condition is satisfied when data communication is generated by an application that is executed in a background.

In some embodiments, the data communication carries non-voice data.

In some embodiments, the suspending the data communication comprises deleting default gateway information of a routing table for packet routing between an application processor and a communication processor of the terminal.

In some embodiments, the method further includes releasing the suspension of data transmission when the voice call is over.

In some embodiments, the method further includes releasing the suspension of data transmission when the strength of the signal rises over a threshold.

An apparatus for controlling data communication in a terminal is provided. The apparatus includes a communication unit configured to communicate data between the terminal and a base station, and a controller configured to detect whether a voice call occurs in the terminal, determine whether a data suspension condition is satisfied after the voice call occurs, and cause the communication unit to suspend the data communication in the terminal while the data suspension condition is satisfied.

In some embodiments, the controller is further configured to convert a signal strength of the terminal into a number of antenna bars that are displayed on a screen of the terminal, and determine whether the number of antenna bars is equal to or less than a threshold.

In some embodiments, the controller is further configured to release the suspension of data transmission when the voice call is over.

In some embodiments, the controller is further configured to releasing the suspension of data transmission when the strength of the signal rises over a threshold.

In accordance with an aspect of the present disclosure, a method for controlling data communication of a terminal includes sensing a voice call that is generated from the terminal; determining whether a data suspension condition that includes terminal's entry into a weak electromagnetic field state is satisfied; and intercepting the data communication of the terminal if the data suspension condition is satisfied.

In accordance with another aspect of the present disclosure, an apparatus for controlling data communication of a terminal includes a state determination unit that determines whether a data suspension condition that includes terminal's entry into a weak electromagnetic field state is satisfied if a voice call that is generated from the terminal is sensed; and a communication control unit that intercepts the data communication of the terminal if the data suspension condition is satisfied.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Advantageous Effects of Invention

According to the method and apparatus for controlling data communication in a weak electromagnetic field according to the present disclosure, if the data suspension condition, such as the terminal's entry into the weak electromagnetic field state, is satisfied during execution of the voice call, the data communication is intercepted to improve the quality of the voice call.

BRIEF DESCRIPTION OF DRAWINGS

For a more complete understanding of the present disclosure and its advantages, reference is now made to the following description taken in conjunction with the accompanying drawings, in which like reference numerals represent like parts:

FIG. 1 is a view explaining the network configuration to which an embodiment of the present disclosure is applied;

FIG. 2 is a block diagram illustrating the internal structure of a terminal according to an embodiment of the present disclosure;

FIG. 3 is a flowchart illustrating a process of controlling data communication of a terminal according to an embodiment of the present disclosure; and FIG. 4 is a flowchart illustrating a process of controlling data communication of a terminal according to another embodiment of the present disclosure.

MODE FOR THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Hereinafter, preferred embodiments of the present disclosure will be described in detail with reference to the accompanying drawings. In the accompanying drawings, the same reference numerals are used for the same constituent elements. Further, detailed description of well-known functions and structures incorporated herein may be omitted to avoid obscuring the subject matter of the present disclosure.

In describing embodiments of the present disclosure in detail, a portable terminal, such as a tablet PC or a smart phone, which can simultaneously provide a CS domain service and a PS domain service will be a main application subject. However, the main concept of the present disclosure can be applied to other terminals adopting similar technology with a slight modification within a range that does not greatly deviate from the scope of the present disclosure, according to the judgment of a person skilled in the art to which the present disclosure pertains.

FIG. 1 is a view explaining the network configuration to which an embodiment of the present disclosure is applied.

Referring to FIG. 1, a base station 110 of a wireless communication network performs transmission/reception of a wireless signal for voice communication and data communication with a terminal 120.

As described above, in a 3G network, a transmission path 130 for a CS domain service and a transmission path 140 for a PS domain service can be generated to be simultaneously used. That is, even while the terminal 120 performs transmission/reception of a voice signal with a base station 110 through the CS path 130, data to be transmitted can be generated from the terminal 120 to be transmitted to the PS path, or data that is directed to the terminal 120 can be transferred from the base station 110 to the terminal 120 through the PS path 140.

If the terminal 120 enters into the weak electromagnetic field state while performing a voice call through the CS path 130, the quality of the voice call can be affected by the transmission/reception of a data packet through the PS path 140. In particular, if data that is not intended by a user, such as data that is automatically generated in a set period with respect to an application installed in the terminal 120, is generated, the quality of the voice call is deteriorated, and further, the voice call can be ended.

Accordingly, in an embodiment of the present disclosure, a method is proposed which can maintain the quality of a voice call by appropriately controlling data communication that is generated in a terminal when the terminal that performs the voice call enters into a weak electromagnetic filed state.

FIG. 2 is a block diagram illustrating the internal structure of a terminal according to an embodiment of the present disclosure.

Referring to FIG. 2, a terminal according to the present disclosure can include a communication unit (transceiver) 210, a signal processing unit (signal processor) 220, an input unit 230, a display unit (screen) 240, a storage unit 250, and a control unit (controller) 260.

The communication unit 210 performs data transmission/reception function for terminal communication using a mobile communication network. For example, the communication unit 210 can include an RF transmitter that up-converts and amplifies a frequency of a signal that is transmitted, and an RF receiver that amplifies a signal that is received and down-converts a frequency of the received signal. Further, the communication unit 210 can receive data through a wireless channel to output the received data to the control unit 260, and can transmit the data output from the control unit 260 through the wireless channel.

As described above, in an embodiment of the present disclosure, the communication unit 210 can perform both signal transmission/reception for the CS domain service and signal transmission/reception for the PS domain service.

The signal processing unit 220 can be composed of a codec that converts a digital signal into an analog signal and vice versa.

The input unit 230 receives an input of a user's operation to control the terminal and generates and transfers an input signal to the control unit 260. The input unit 230 can be implemented by a keypad that includes numeral keys and direction keys or a mouse device, and in a case where the terminal is a portable device, the input unit 230 can be integrally formed with the display unit 240 according to an embodiment of the present disclosure. Further, in a case where the display unit 240 according to an embodiment of the present disclosure is implemented by a touch type display, the key input unit 230 can be minimized or omitted.

The display unit 240 visually provides a user of menus of the terminal, input data, function setting information, and other various pieces of information. The display unit 240 functions to output a booting screen of the terminal, a standby screen, a menu screen, a call screen, and other application screens. Further, in an embodiment of the present disclosure, the display unit 240 displays thumbnails of files stored in the terminal and storage paths of the files, and moves the position of the thumbnail or displays the changed storage path in response to an input command.

The display unit 240 can be composed of a Liquid Crystal Display (LCD), an Organic Light Emitting Diode (OLED), an Active Matrix Organic Light Emitting Diode (AMOLED), a flexible display, or a 3D display.

In a case where the display unit 240 is implemented by a touch type display according to an embodiment of the present disclosure, the display unit 240 can further include a touch sensor unit in place of the input unit 230. The touch sensor unit converts a change of pressure that is applied to a specific region or capacitance that is generated in the specific region into an electrical input signal. In this case, the touch sensor unit can detect not only a touched position and area but also pressure during the touch.

That is, the touch sensor senses a user's touch input, and generates and transfers a sensed signal to the control unit 260. The sensed signal can include coordinate information touched by the user. If the user moves (drags) in a touch state, the touch sensor unit generates the sensed signal that includes the coordinate information of the moving path and transfers the sensed signal to the control unit 260.

The touch sensor unit can be composed of a touch sensor of capacitive overlay, resistive overlay, surface acoustic wave, or infrared beam, or a pressure sensor. In addition to the above-described sensors, all kinds of sensor devices that can sense a contact or pressure of an object can be configured as the touch sensor unit of the display unit 240 according to an embodiment of the present disclosure.

The storage unit 250 serves to store programs and data required for the operation of the terminal, and can be divided into a program region and a data region. The program region can store a program that controls the whole operation of the terminal, an Operating System (OS) that boots the portable terminal, application programs that are necessary for multimedia content reproduction, and application programs that are necessary for other optional functions of the terminal, for example, voice conversation function, camera function, sound reproduction function, and image or moving image reproduction function. The data region is a region where files that are generated according to the use of the terminal or input from an outside are stored, and can store image files, moving image files, audio files, and document files.

The control unit 260 controls the whole operation of respective constituent elements of the terminal. Particularly, in order to control data communication according to an embodiment of the present disclosure, the control unit 260 can include a state determination unit 262 and a communication control unit 264. The state determination unit 262 determines whether the state of the terminal satisfies conditions for controlling the data communication, and the communication control unit 264 controls the data communication of the terminal according to the determination result of the state determination unit 262.

On the other hand, the configuration of the terminal illustrated in FIG. 2 is merely exemplary, and the respective units of the terminal can be implemented in various forms so as to perform operations according to an embodiment of the present disclosure.

Hereinafter, a method for controlling data communication according to an embodiment of the present disclosure will be described in detail.

FIG. 3 is a flowchart illustrating a process of controlling data communication of a terminal according to an embodiment of the present disclosure. The data communication control process of FIG. 3 can be performed by a single control module that is implemented in the terminal or by mutual actions between a plurality of modules.

Referring to FIG. 3, at operation 310, the terminal senses execution of a voice call. The call-related state of the terminal can be classified into a ringing state in which a call request is received in the terminal and the bell rings, an off-hook state in which the call is connected, and a general idle state. Among the above-described states, when the terminal is in the ringing state or the off-hook state, it can be determined that the terminal is executing the voice call.

Next, at operation 320, it is determined whether the current state of the terminal satisfies one of data suspension conditions. The data suspension conditions can include any situations on which data communication is need to be suspended during a voice call to reduce interference between voice and data communications, including cases that the terminal enters into the weak electromagnetic field, and whether data transmission that is not intended by the user is generated.

Whether the terminal enters into the weak electromagnetic field state can be determined through measurement of the strength of a signal that the terminal receives. In some embodiments, the signal strength is converted to the number of antenna bars displayed on the screen of the terminal, and when the number of antenna bars is less than a threshold, the suspension condition is satisfied.

Further, whether the data that is not intended by the user is generated can be determined based on whether the data is data related to an application that is executed in a background or whether the data is data that is generated in a state where illumination of the display unit (screen) is turned off.

If it is determined that the state of the terminal satisfies the data suspension conditions, the terminal suspends the data communication at operation 330. The method for suspending the data communication can be a method for maintaining only the connection for the voice call through releasing of a network connection for data communication or a method for suspending data transfer between processors in the terminal in a state where the network connection is maintained.

Hereinafter, a method for controlling data communication according to another embodiment of the present disclosure will be described in detail with reference to the respective operations of FIG. 3.

FIG. 4 is a flowchart illustrating a process of controlling data communication of a terminal according to another embodiment of the present disclosure.

Referring to FIG. 4, at operation 410, the terminal senses that a voice call is currently executed. As described above, the execution of the voice call can be determined based on the ringing state in which the bell rings and the off-hook state in which the call is connected.

Next, at operation 420, it is determined whether the terminal enters into the weak electromagnetic field state based on whether the number of antenna bars that are displayed on the display unit of the terminal is equal to or smaller than a preset suspension threshold value.

Here, according to another embodiment of the present disclosure, it should be considered that whether the terminal enters the weak electromagnetic field state can be determined according to a signal strength measurement algorithm of the terminal even if the change of the number of antenna bars is not reflected. That is, whether the terminal enters into the weak electromagnetic field state can be determined through various modifications in addition to the above-described embodiments of the present disclosure.

Hereinafter, explanation will be made on the assumption that the measurement result of the signal strength of the terminal is immediately reflected in the number of antenna bars.

The terminal adopts a correction algorithm that converts the signal strength into the number of antenna bars that are displayed on the display unit. Accordingly, the terminal can convert Received Signal Code Power (RSCP), Energy per chip over the Interference Noise (EcIO), and Ec/No values of a 3G network into the number of antenna bars, and can determine the number of antenna bars using the minimum value or the maximum value of the converted number of antenna bars.

In an embodiment of the present disclosure, if the number of antenna bars determined as described above is equal to or smaller than a predetermined suspension threshold value, it can be determined that the terminal has entered into the weak electromagnetic field state. In contrast, if the number of antenna bars is equal to or larger than a predetermined restoration threshold value, it can be determined that the terminal gets out of the weak electromagnetic field state and thus can reopen the data communication.

In this case, the suspension threshold value and the restoration threshold value can be set to have a specific gap between them. For example, the suspension threshold value can be set to "1" and the restoration threshold value can be set to "3". In this state, if the number of antenna bars is decreased from "2" to "1", the suspension condition of the data communication is satisfied. Even if the number of antenna bars is increased again from "1" to "2", the suspension condition of the data communication is still satisfied, but if the number of antenna bars is increased to "3", the data communication is reopened. In contrast, even if the number of antenna bars is decreased from "3" to "2", the suspension condition of the data communication is not satisfied to maintain the present state, but if the number of antenna bars is decreased to "1", the suspension condition is satisfied.

As described above, if there is the gap between the suspension threshold value and the restoration threshold value, a ping pong phenomenon, in which the suspension and reopen of the data communication are frequently repeated even if the number of antenna bars is increased and decreased within a small range, can be prevented from occurring.

At operation 420, if it is determined that the terminal has entered into the weak electromagnetic field state, the terminal, at operation 430, determines whether the data is data that is not intended by the user based on whether the display unit, that is, the screen, of the terminal is in an off state.

In general, it is difficult to determine whether the data that is generated in middleware and driver/modem layers is foreground data or background data, and in an application layer, it is unable to compulsorily suspend the data use with respect to all applications.

Accordingly, in an embodiment of the present disclosure, the state of the display unit is used to determine whether the data is data that is not intended by the user. Specifically, if the display unit is in an off state, the user is unable to trigger the data communication as confirming the contents that are displayed on the display unit, and thus the foreground data is unable to be generated.

Accordingly, the terminal determines that a period when the display unit is in an off state is a period when the data that is not intended by the user is used, and if the display unit is turned on again, the terminal can determine that the period is a period when the data communication is used.

At operation 430, if it is determined that the screen is in an off state and the data communication suspension conditions are all satisfied, the terminal, at operation 440, can suspend the data communication of the terminal through deletion of default gateway information of a routing table for packet routing between an Application Processor (AP) and a Communication Processor (CP).

Accordingly, both the data that is generated in the application layer to be transmitted to the network and the data that is received in the terminal to be transferred to the application layer can be suspended.

Another method for suspending the data communication can be a method for inactivating a packet data protocol. In this case, it is necessary to release a PDP session with the network, and thus unnecessary signal transmission/reception can be performed with the network.

In an embodiment of the present disclosure, by managing the routing table that is provided for packet routing between the AP and CP after PDP activation, it is possible to control the suspension and reopening of the data communication.

Specifically, in a case of suspending the data communication of the terminal, default gateway information for an AP-CP communication socket is deleted, and the suspension of the data communication is reported to the application layer. In contrast, in a case of reopening the data communication, the default gateway information for the AP-CP communication socket is reset in the routing table, and the reopening of the data communication can be reported to the application layer.

On the other hand, if there is no packet data that is transmitted or received between the terminal and the network or there is no packet data that is transferred between the AP and CP, the terminal transmits a Signaling Connection Release Indication (SCRI) message to the network and receives an RRC connection release message from the network in response to the SCRI message to release the connection with the network.

In an embodiment of the present disclosure, since it is intended to suspend a packet data in the terminal while maintaining the connection with the terminal, it is necessary that the SCRI message is not transmitted to the network. Accordingly, signal information indication can be transmitted to the interface unit that monitors packet data transmission/reception in the terminal to prevent the connection with the network from being released.

The process of controlling the data communication of the terminal as described above can be expressed as in Table 1 below.

TABLE 1

```
if (PhoneState != IDLE && SCREEN_STATE == OFF) {
  if ((DataState != SUSPENDED && SignalBar == 1)){
    remove Default GateWay on rmnet
  }
  else if (DataState == SUSPENDED && SignalBar < 3) {
    remain routing table as current state.
  }
  else
    add Default GateWay on rmnet
}
else
  add Default GateWay on rmnet
```

As described above, if the data suspension condition, such as the terminal's entry into the weak electromagnetic field state, is satisfied during execution of the voice call, the data communication is suspended to improve the quality of the voice call. In this case, the connection with the network is maintained, and thus if the user triggers the data communication during the voice call, the data communication can be provided simultaneously with the voice call.

It will be understood by those of ordinary skill in the art to which the present disclosure pertains that various changes in form and detail may be made therein without changing the technical idea or essential features of the present disclosure. Accordingly, it will be understood that the above-described embodiments are exemplary in all aspects and do not limit the scope of the present disclosure. Accordingly, the scope of the present disclosure is defined by the appended claims, and it will be construed that all changes and modifications derived from the meanings and scope of the following claims and the equivalent concept fall within the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method for controlling data communication in an electronic device, the method comprising:
   detecting, by at least one processor of the electronic device, a strength of a wireless signal during a voice call;
   when the detected strength of the wireless signal is less than a threshold and a screen of the electronic device is off, suspending, by the at least one processor of the electronic device, data communication during the voice call,
   wherein the at least one processor comprises:
      a communication processor (CP) configured to control a transceiver of the electronic device, and
      an application processor (AP) electrically connected to the CP, and
   wherein the suspending the data communication comprises deleting, by the AP, gateway information in a routing table for packet routing between the AP and the CP while maintaining a packet data protocol session for connecting the electronic device and an external network.

2. The method of claim 1, further comprising:
   converting, by the at least one processor of the electronic device, the strength of the wireless signal into the number of antenna bars that are displayed on the screen of the electronic device; and
   in response that the number of antenna bars is equal to or less than a threshold, suspending, by the at least one processor of the electronic device, the data communication.

3. The method of claim 1, further comprising, in response that the data communication is generated by an application that is executed in a background, suspending, by the at least one processor of the electronic device, the data communication.

4. The method of claim 1, wherein the data communication carries non-voice data.

5. The method of claim 1, further comprising:
   releasing, by the at least one processor of the electronic device, the suspension of data transmission when the voice call is over.

6. The method of claim 1, further comprising:
   releasing, by the at least one processor of the electronic device, the suspension of data transmission when the strength of the wireless signal rises over the threshold.

7. An electronic device for controlling data communication, the electronic device comprising:
   a transceiver configured to communicate data between the electronic device and an external network; and
   at least one processor; and
   a memory electrically connected to the at least one processor and configured to store instructions,
   wherein the instructions enable the at least one processor to:
      detect a strength of a wireless signal during a voice call; and
      when the detected strength of the wireless signal is less than a threshold and a screen of the electronic device is off, suspend data communication during the voice call,
   wherein the at least one processor comprises:
      a communication processor (CP) configured to control the transceiver, and
      an application processor (AP) electrically connected to the CP,
   wherein the AP is configured to suspend data communication by deleting gateway information in a routing table for packet routing between the AP and the CP while maintaining a packet data protocol session for connecting the electronic device and the external network.

8. The electronic device of claim 7, wherein the at least one processor is further configured to:
   convert the signal strength of the wireless signal into the number of antenna bars that are displayed on the screen of the electronic device; and
   in response that the number of antenna bars is equal to or less than a threshold, cause the communication circuit to suspend the data communication.

9. The electronic device of claim 7, wherein the at least one processor is further configured to, in response that the data communication is generated by an application that is executed in a background, cause the communication circuit to suspend the data communication.

10. The electronic device of claim 7, wherein the data communication carries non-voice data.

11. The electronic device of claim 7, wherein the at least one processor is further configured to release the suspension of data transmission when the voice call is over.

12. The electronic device of claim 7, wherein the at least one processor is further configured to release the suspension of data transmission when the strength of the wireless signal rises over the threshold.

* * * * *